United States Patent
Lu et al.

(10) Patent No.: US 11,102,774 B2
(45) Date of Patent: Aug. 24, 2021

(54) DATA TRANSMISSION METHOD AND TERMINAL DEVICE

(71) Applicant: GUANGDONG OPPO MOBILE TELECOMMUNICATIONS CORP., LTD., Guangdong (CN)

(72) Inventors: Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/088,332

(22) Filed: Nov. 3, 2020

(65) Prior Publication Data

US 2021/0051638 A1    Feb. 18, 2021

Related U.S. Application Data

(63) Continuation of application No. PCT/CN2019/081275, filed on Apr. 3, 2019.

(30) Foreign Application Priority Data

Jun. 29, 2018  (CN) .......................... 201810713184.4

(51) Int. Cl.
*H04W 72/04* (2009.01)
*H04W 4/40* (2018.01)
*H04L 5/00* (2006.01)

(52) U.S. Cl.
CPC ......... *H04W 72/042* (2013.01); *H04L 5/0053* (2013.01); *H04L 5/0094* (2013.01); *H04W 4/40* (2018.02)

(58) Field of Classification Search
CPC ........... H04W 4/40; H04W 4/46; H04W 4/48; H04W 72/044; H04W 4/44;
(Continued)

(56) References Cited

U.S. PATENT DOCUMENTS

2013/0322413 A1    12/2013 Pelletier et al.
2015/0043396 A1*   2/2015 Ekpenyong ........... H04L 5/1438
                                                            370/280
(Continued)

FOREIGN PATENT DOCUMENTS

| CN | 107041002 A | 8/2017 |
| WO | 2018004323 A1 | 1/2018 |
| WO | 2018088951 A1 | 5/2018 |

OTHER PUBLICATIONS

3GPP TS 36.213 V15.4.0 (Dec. 2018)—Release 15—14 UE procedures related to Sidelink (57 pages).
(Continued)

*Primary Examiner* — Faruk Hamza
*Assistant Examiner* — Abusayeed M Haque
(74) *Attorney, Agent, or Firm* — Perkins Coie LLP

(57) ABSTRACT

A data transmission method and a terminal device are disclosed, which may solve the data transmission problems of a sidelink when the size of a time unit of a downlink and the size of a time unit of the sidelink are not the same. The method includes that a terminal device receives first control information sent by a network device, and determines a sending time for sidelink data according to the first control information.

14 Claims, 3 Drawing Sheets

(58) Field of Classification Search
CPC ............. H04W 72/1242; H04L 5/0094; H04L 5/0053; H04L 5/0069
See application file for complete search history.

(56) References Cited

U.S. PATENT DOCUMENTS

| | | | |
|---|---|---|---|
| 2016/0044668 A1 | 2/2016 | Yoon | |
| 2017/0373738 A1* | 12/2017 | Chae | H04B 7/0617 |
| 2018/0302889 A1* | 10/2018 | Guo | H04B 7/088 |
| 2019/0174530 A1* | 6/2019 | Kim | H04L 1/0025 |
| 2019/0246254 A1* | 8/2019 | Chatterjee | H04L 5/0053 |
| 2020/0015176 A1* | 1/2020 | Li | H04L 5/0082 |
| 2020/0077432 A1* | 3/2020 | Xiong | H04L 1/1825 |
| 2020/0146107 A1* | 5/2020 | Xiong | H04W 76/27 |
| 2020/0163103 A1* | 5/2020 | Kuang | H04W 72/04 |
| 2020/0374031 A1* | 11/2020 | Baldemair | H04L 1/003 |

OTHER PUBLICATIONS

International Search Report dated Jun. 27, 2019 of PCT/CN2019/081275 (4 pages).
Panasonic. "Introducing sTTI to V2X Mode 3" 3GPP TSG RAN WG1 Meeting #92 RI-1802444, Mar. 2, 2018 (Mar. 2, 2018) (4 pages).
Panasonic. "Introducing sTTI to V2X Mode 3" 3GPP TSG RAN WG1 Meeting #92bis RI-1804627, Apr. 20, 2018 (Apr. 20, 2018) (4 pages).
Panasonic. "Introducing sTTI to V2X Mode 3" 3GPP TSG RAN WG1 Meeting #93 RI-1806950, May 25, 2018 (May 25, 2018) (4 pages).
3GPP TS 36.212 V15.3.0 (Sep. 2018), Technical Specification—3rd Generation Partnership Project; Technical Specification Group Radio Access Network; Evolved Universal Terrestrial Radio Access (E-UTRA); Multiplexing and channel coding (Release 15) (247 pages).
EPO, Extended European Search Report for European Patent Application No. 19827394.8. dated Jun. 29, 2021. 9 pages.
IPA, Examination Report No. 1 for Australian Patent Application No. 2019295826. dated Jun. 29, 2021. 4 pages.
Panasonic "Introducing sTTI to V2X mode 3" R1-1806950, 3GPP TSG RAN WG1 Meeting #93, May 2018, 4 pages.

* cited by examiner

DATA TRANSMISSION METHOD AND TERMINAL DEVICE

CROSS-REFERENCE TO RELATED APPLICATIONS

This application is a continuation application of International Application No. PCT/CN2019/081275 filed on Apr. 3, 2019, which claims priority of Chinese patent application NO. 201810713184.4, filed to CNIPA on Jun. 29, 2018, entitled "Data Transmission Method and Terminal Device in Vehicle to Everything". The entire disclosures of the above-identified applications are hereby incorporated by reference.

TECHNICAL FIELD

Implementations of the present application relate to the field of communication, and particularly, relate to a method for data transmission and a terminal device.

BACKGROUND

A Vehicle to Everything (V2X) system is a Sidelink (SL) transmission technology based on Long Term Evaluation Vehicle to Vehicle (LTE V2V). Different from a traditional LTE system in which communication data are received or sent through a base station, the V2X system adopts a direct communication mode of terminal-to-terminal, thus having higher spectral efficiency and lower transmission delay.

A V2X system based on New Radio (NR), referred to as an NR-V2X system, needs to support automatic driving, which may need to support larger bandwidth, for example, tens of Mbps or even wider bandwidth, or to support more flexible time slot structure, for example, multiple subcarrier spacings are supported on a sidelink of the NR-V2X system, while only one subcarrier spacing needs to be supported on that of the V2X system based on LTE, referred to as an LTE-V2X system.

In a future V2X system, the LTE-V2X system and the NR-V2X system may coexist on a sidelink, accordingly it is necessary to support the two sidelink structures at the same time for a vehicle terminal. Thus, in sidelink transmission based on network scheduling, there may be a case in which a size of a time unit of a downlink may be inconsistent with that of a sidelink. In this case, how to determine transmission time of a sidelink to perform data transmission is an urgent problem to be solved.

SUMMARY

Implementations of the present application provide a method for data transmission and a terminal device. The terminal device may determine transmission time of sidelink data according to first control information from a network device, thereby realizing data transmission of the sidelink.

In a first aspect, a method for data transmission is provided. The method includes: a terminal device receives first control information sent by a network device, and the terminal device determines transmission time of sidelink data according to the first control information.

In a second aspect, a terminal device is provided, which is configured to perform methods in the above first aspect or any possible implementation of the first aspect. Specifically, the terminal device includes units configured to perform the above first aspect or the method in any possible implementation of the first aspect.

In a third aspect, a terminal device is provided. The terminal device includes a processor and a memory. The memory is configured to store a computer program, and the processor is configured to call and run the computer program stored in the memory to perform the above first aspect or the method of each implementation of the first aspect.

In a fourth aspect, a chip is provided, which is configured to perform the above first aspect or the method of each implementation of the first aspect.

Specifically, the chip includes a processor configured to call and run a computer program from a memory, so that a device mounted with the chip performs the above first aspect or the method of each implementation of the first aspect.

In a fifth aspect, a computer readable storage medium is provided, which is configured to store a computer program that enables a computer to perform the above first aspect or the method of each implementation of the first aspect.

In a sixth aspect, a computer program product is provided, which includes computer program instructions that enable a computer to perform the above first aspect or the method of each implementation of the first aspect.

In a seventh aspect, a computer program is provided. When the computer program is run on a computer, the computer is enabled to perform the above first aspect or the method of each implementation of the first aspect.

DETAILED DESCRIPTION

Technical solutions in implementations of the present application will be described below with reference to the accompanying drawings in the implementations of the present application. It is apparent that the implementations described are just some but not all implementations of the present application. According to the implementations of the present application, all other implementations achieved by a person of ordinary skill in the art without paying an inventive effort are within the protection scope of the present application.

It should be understood that the technical solutions of the implementations of the present application may be applied to a Device-to-Device (D2D) communication system, for example, a vehicle to everything system that performs a D2D communication based on Long Term Evolution (LTE). Different from a traditional LTE system in which communication data between terminals is received or sent through a network device (e.g., a base station), the vehicle to everything system adopts a direct communication mode of terminal-to-terminal, thus having higher spectral efficiency and lower transmission delay.

Optionally, a communication system on which a vehicle to everything system is based may be a Global System of Mobile communication (GSM) system, Code Division Multiple Access (CDMA) system, Wideband Code Division Multiple Access (WCDMA) system, General Packet Radio Service (GPRS) system, LTE system, LTE Frequency Division Duplex (FDD) system, LTE Time Division Duplex (TDD) system, Universal Mobile Telecommunication System (UMTS) system, Worldwide Interoperability for Microwave Access (WiMAX) communication system, 5G New Radio (NR) system, etc.

A terminal device in the implementation of the present application may be a terminal device capable of realizing D2D communication. For example, it may be a vehicle-mounted terminal device, a terminal device in a 5G network or a terminal device in a Public Land Mobile Network (PLMN) to be evolved in the future, and the implementation of the present application is not limited thereto.

Figure 1:
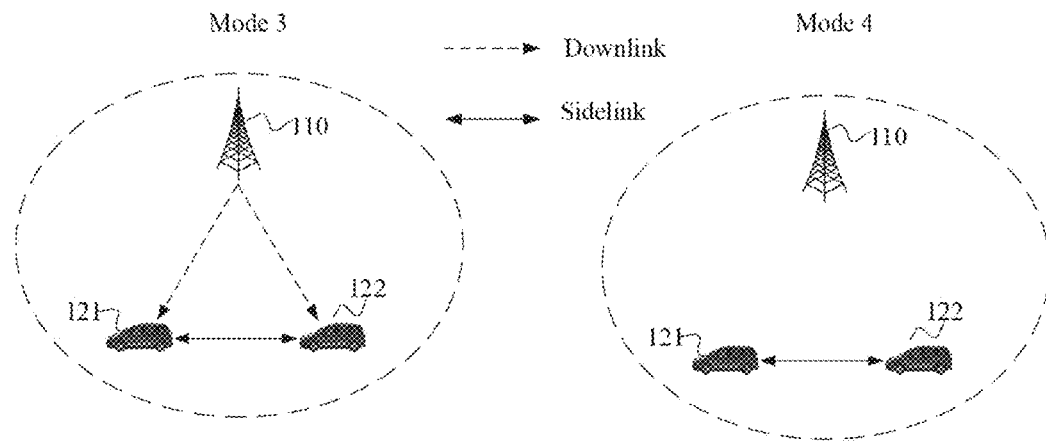
FIG. 1 is a schematic diagram of architecture of a communication system according to an implementation of the present application.

FIG. 1 is a schematic diagram of an application scenario according to an implementation of the present application. FIG. 1 exemplifies one network device and two terminal devices. Optionally, a wireless communication system in the implementation of the present application may include a plurality of network devices, and a coverage area of each network device may include other number of terminal devices, which is not limited in the implementation of the present application.

Optionally, the wireless communication system may include other network entities such as a Mobile Management Entity (MME), a Serving Gateway (S-GW), a Packet Data Network Gateway (P-GW), or, the wireless communication system may include other network entities such as a Session Management Function (SMF), a Unified Data Management (UDM), an Authentication Server Function (AUSF), etc. The implementation of the present application is not limited thereto.

In the vehicle to everything system, terminal devices may communicate in mode 3 and mode 4.

Specifically, a terminal device 121 and a terminal device 122 may communicate through a D2D communication mode. During a D2D communication, the terminal device 121 and the terminal device 122 directly communicate through a D2D link, that is, a Sidelink (SL). Herein, in mode 3, a transmission resource of the terminal device is allocated by a base station, and the terminal device may send data on SL according to the resource allocated by the base station. The base station may allocate a resource for single transmission or semi-static transmission for the terminal device. In mode 4, the terminal device adopts a transmission mode of sensing and reservation, and the terminal device autonomously selects a transmission resource on SL resources. Specifically, the terminal device acquires a set of available transmission resources in a resource pool by sensing, and the terminal device randomly selects a resource from the set of available transmission resources for data transmission.

D2D communication may refer to vehicle to vehicle (V2V) communication or vehicle to everything (V2X) communication. In the V2X communication, X may generally refer to any device with wireless receiving and sending capabilities, such as but not limited to a wireless device that moves slowly, a vehicle-mounted device that moves fast, or a network control node with wireless transmitting and receiving capabilities. It should be understood that the implementations of the present application are mainly applied to V2X communication scenarios, may also be applied to any other D2D communication scenarios, and the implementations of the present application are not limited thereto.

As multiple communication systems coexist, there may be situations in which a downlink and a sidelink in the vehicle to everything system are based on different communication systems, for example, one is based on an LTE system and the other is based on an NR system. There may be the following situations in sidelink data transmission based on network scheduling.

Situation one: a sidelink based on the LTE system is scheduled by a downlink based on the LTE system.

Situation two: a sidelink based on the NR system is scheduled by a downlink based on the LTE system.

Situation three: a sidelink based on the LTE system is scheduled by a downlink based on the NR system.

Situation four: a sidelink based on the NR system is scheduled by a downlink based on the NR system.

Then, in the last three situations, there may be a case in which a size of a time unit of a downlink is inconsistent with that of a sidelink. For example, in situation two, a time unit of a downlink based on the LTE system is a subframe, i.e., 1 ms, while a time unit of a sidelink based on the NR system is 0.5 ms (in this case, subcarrier spacing of the sidelink based on the NR system is 30 kHz), thus one downlink subframe corresponds to two time slots of the sidelink. In this case, if a terminal device receives scheduling information at time n, sidelink data will be sent at time n+4, wherein, the time n+4 is based on the time unit of the downlink, which corresponds to two time slots of the sidelink, then the terminal device needs to determine transmission time of sidelink data before sending the sidelink data.

Figure 2:
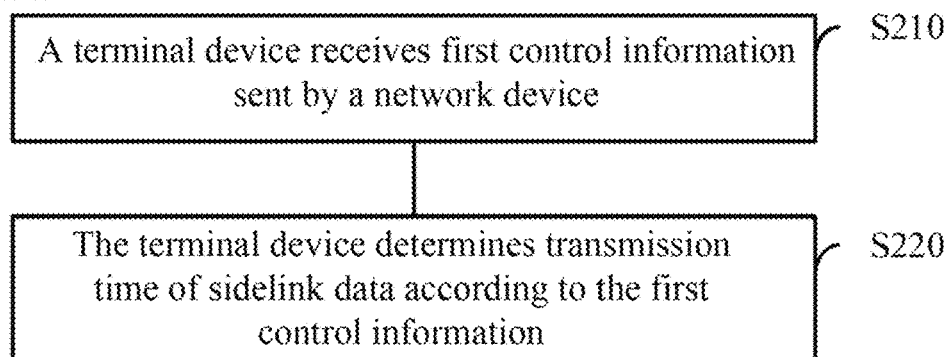
FIG. 2 is a schematic diagram of a method for data transmission according to an implementation of the present application.

FIG. 2 is a schematic flow chart of a method for data transmission according to an implementation of the present application. The method may be performed by a terminal device in the vehicle to everything. As shown in FIG. 2, the method may include the following acts S210 to S220.

In S210, a terminal device receives first control information sent by a network device.

In S220, the terminal device determines transmission time of sidelink data according to the first control information.

Specifically, the terminal device may receive the first control information sent by the network device. Optionally, the first control information may be Downlink Control Information (DCI) or other downlink information, which is not limited by the implementations of the present application. The first control information may be used for the terminal device to determine the transmission time of the sidelink data, for example, the first control information may directly or indirectly indicate the transmission time of the sidelink data, so that the terminal device may determine the transmission time of the sidelink data according to the first control information from the network device before sending the sidelink data, and may further send the sidelink data at the transmission time of the sidelink data, which is beneficial to avoiding a problem that the terminal device does not know a time unit on which the sidelink data is sent when a size of a time unit of a downlink is inconsistent with that of a sidelink.

Optionally, in some implementations, the network device may directly indicate the transmission time of the sidelink data through the first control information, or may indicate the transmission time of the sidelink data through indication information carried in the first control information. Optionally, the first control information may be sent in a specific way, and a sending way of the first control information implicitly indicates the transmission time of the sidelink data, which is not limited by the implementations of the present application.

In some specific implementations, the first control information may be DCI, and the first control information may include first indication information, the first indication information may be used for indicating the transmission time of the sidelink data. That is, the network device may include the indication information in scheduling information to indicate the transmission time of the sidelink data to the terminal device.

For example, the first indication information may be used for indicating an index value or index values of one or more time units, and the index value or index values of one or more time units may be an index value or index values relative to a specific boundary, so that the terminal device may determine the transmission time of the sidelink data according to the specific boundary and the index value or index values, and may further send the sidelink data at the transmission time. Optionally, the first indication information may be used for indicating an offset value of a time unit, the offset value of the time unit may be an offset value of a time unit relative to a specific boundary. For example, if a time unit of the sidelink is 0.5 ms, the offset value may be 4 ms or 4.5 ms, etc. Therefore, the terminal device may determine the transmission time of the sidelink data according to the specific boundary and the offset value of the time unit, and may further send the sidelink data at the transmission time.

That is, the first indication information may be used for indicating the number of time units offsetting from a specific boundary, or may indicate a time length offsetting from the specific boundary, i.e., how long it offsets from the specific boundary, or may indicate the transmission time of the sidelink data in other ways, which are not limited by the implementations of the present application. It should be noted that the following is mainly described by taking an example of the first indication information indicating an index value of a time unit relative to the specific boundary, which should not construct any limitation to the implementations of the present application. When the first indication information indicates an offset value relative to the specific boundary, a similar determination approach may be adopted, which is not repeated for brevity.

It should be understood that the sidelink data in the implementation includes a sidelink control channel and/or a sidelink shared channel.

It should further be understood that the implementations of the present application do not specifically limit a time unit of a downlink and a time unit of a sidelink. For example, the time unit of the downlink may be a time slot, a subframe or a short Transmission Time Interval (sTTI), or any other unit that may be used for measuring a length of time. The time unit of the sidelink may be a time slot, a subframe or an sTTI, or any other unit that may be used for measuring a length of time. Hereinafter, in combination with implementations one to four, the subframe is mainly taken as an example for description, but which should not construct any limitation to the implementations of the present application.

Implementation One

The specific boundary is a boundary of a radio frame, and one radio frame includes N sidelink time units, and the first indication information is used for indicating an index value or index values of one or more of N time units, and N is an integer greater than 1. Then, the terminal device may determine a time unit or time units corresponding to the index value or index values in the N sidelink time units as transmission time of sidelink data.

In a specific implementation, an index value of a time unit indicated by the first indication information may be a subframe index or subframe indexes of one or more subframes in the N sidelink subframes included in a radio frame. For example, if a sidelink radio frame is 10 ms and a sidelink subframe is 0.5 ms, that is, 20 sidelink subframes (the index values are 0-19) are included, and the subframe index indicated by the first indication information may be one or more of 0-19.

It should be understood that in some cases, the time unit indicated by the index value may be unavailable. For example, after receiving scheduling information, the terminal device needs a certain length of processing time before sending sidelink data. If a time unit indicated by the index value is within the processing time (denoted as scene one), the time unit may be considered as unavailable. Or, if a time unit indicated by the index value may be a downlink subframe or a special subframe (denoted as scene two), for example, for a paired spectrum system (e.g., FDD) or an unpaired spectrum system (e.g., TDD), the time unit may also be considered as unavailable. Since there is a time unit with the same index value in each radio frame, the terminal device may select an available time unit corresponding to the index value in another radio frame after the current radio frame. For example, the terminal device may select a first available time unit corresponding to the index value to transmit the sidelink data, and the first available time unit corresponding to the index value is located in a k1-th radio frame after the current radio frame. Optionally, k1 is 1 or another value.

Optionally, in some cases, if a time unit indicated by the index value is available, the terminal device may transmit the sidelink data in the time unit indicated by the index value in the current radio frame.

Generally, if the time unit indicated by the index value is available in the current radio frame, the terminal device may determine the time unit corresponding to the index value in the current radio frame as the transmission time of the sidelink data. Or, if the time unit indicated by the index value is unavailable in the current radio frame, the terminal device may determine an a1-th available time unit indicated by the index value after the current radio frame as the transmission time of the sidelink data, a1 is 1 or another value, or the terminal device may determine a b1-th available sidelink time unit after the time unit indicated by the index value in the current radio frame as the transmission time of the sidelink data, optionally, b1 is 1 or another value.

For example, in a radio frame P1, a network device sends DCI in a downlink subframe p1, the downlink subframe p1 corresponds to a sidelink subframe q1, and a downlink subframe p1+4 corresponds to a sidelink subframe q1+8 and a sidelink subframe q1+9. The index value is k1 which is used for indicating a subframe index in a radio frame. Processing time of the terminal device is considered from the sidelink subframe q1 to the sidelink subframe q1+8, then there are two cases for a timing sequence of the sidelink subframe k1 and the sidelink subframe q1+8 as below.

Case one: the sidelink subframe k1 is earlier than the sidelink subframe q1+8.

In this case, the sidelink subframe k1 is considered as unavailable. If a sidelink subframe k1 in a radio frame after the radio frame P1, i.e., a radio frame P1+a1, is available, the terminal device may postpone sending the sidelink data on the sidelink subframe k1 in the radio frame P1+a1, otherwise, continues to postpone sending the sidelink data. Or, the terminal device may determine the sidelink subframe q1+8 in the current radio frame or a b1-th available sidelink subframe after the sidelink subframe q1+8 as the transmission time of the sidelink data, herein a1 is 1 or another value, and b1 is 1 or another value.

Case two: the sidelink subframe k1 is the sidelink subframe q1+8, or later than the sidelink subframe q1+8.

In this case, the sidelink subframe k1 may be considered as available, then the terminal device may send sidelink data on the sidelink subframe k1 in the current radio frame P1.

It should be understood that the radio frame in the implementation is a radio frame on the sidelink.

Implementation Two

The specific boundary is a boundary of a radio frame period, one radio frame period includes L sidelink time units, L is an integer greater than 1. The first indication information is used for indicating an index value or index values of one or more time units in L time units, the terminal device may determine a time unit or time units indicated by the index value or index values in the L time units as transmission time of sidelink data.

In a specific implementation, an index value of a time unit indicated by the first indication information may be a subframe index subframe indexes of one or more subframes in the L sidelink subframes included in the radio frame period. For example, if the radio frame period includes P (e.g., 1024) radio frames, and each radio frame includes Q (e.g., 10) sidelink subframes, the first indication information may indicate one or more subframes in subframes with index values 0-10239. Of course, optionally, a two-stage index (e.g., a radio frame index value and a subframe index value) or two-stage indexes may be used for indicating one or more subframes in a radio frame period.

Similar to implementation one, in some cases, there are cases in which a time unit indicated by the index value may be unavailable, for example, the aforementioned scene one or scene two. Since there is a time unit with the same index value in each radio frame period, the terminal device may select an available time unit corresponding to the index value in another radio frame period after the current radio frame period. For example, the terminal device may select a first available time unit corresponding to the index value to transmit sidelink data, the first available time unit corresponding to the index value is located in a k2-th radio frame period after the current radio frame period, k2 is 1 or another value.

Optionally, in some cases, if a time unit indicated by the index value is available, the terminal device may transmit the sidelink data on the time unit indicated by the index value in the current radio frame period.

Generally, if the time unit indicated by the index value is available in the current radio frame period, the terminal device may determine the time unit corresponding to the index value in the current radio frame period as the transmission time of the sidelink data. If the time unit indicated by the index value is unavailable in the current radio frame period, the terminal device may determine an a2-th available time unit indicated by the index value after the current radio frame period as the transmission time of the sidelink data, a2 is 1 or another value; or the terminal device may determine a b2-th available sidelink time unit after the time unit indicated by the index value in the current radio frame period as the transmission time of the sidelink data, optionally, b2 is 1 or another value.

For example, in a radio frame period C1, a network device sends DCI in a downlink subframe p2, the downlink subframe p2 corresponds to a sidelink subframe q2, and a downlink subframe p2+4 corresponds to a sidelink subframe q2+8 and a sidelink subframe q2+9. The index value is k2 which is used for indicating a subframe index in a radio frame period. Processing time of the terminal device is considered from the sidelink subframe q2 to the sidelink subframe q2+8, there are two cases in a timing sequence of the sidelink subframe k2 and the sidelink subframe q2+8 as below.

Case one: the sidelink subframe k2 is earlier than the sidelink subframe q2+8. In this case, the sidelink subframe k2 may be considered as unavailable. If a sidelink subframe k2 in a radio frame period after the radio frame period C1, i.e., a radio frame period C1+a2, is available, the terminal device may postpone sending sidelink data on the sideink subframe k2 in the radio frame period C1+a2, otherwise, continues to postpone sending the sidelink data. Or, the terminal device may determine the sidelink subframe q2+8 in the current radio frame period or a b2-th available sidelink subframe after the sidelink subframe q2+8 as the transmission time of the sidelink data.

Case two: the sidelink subframe k2 is the sidelink subframe q2+8 or later than the sidelink subframe q2+8.

In this case, the sidelink subframe k2 may be considered as available, then the terminal device may send the sidelink data on the sidelink subframe k2 in the current radio frame period C1.

Implementation Three

The specific boundary is a first sidelink time unit, the first sidelink time unit is determined according to a second sidelink time unit. The second sidelink time unit is a time unit of a sidelink on which the terminal device receives the first control information, and the first indication information is used for indicating an index value or index values of one or more time units relative to the first sidelink time unit.

Therefore, according to the first indication information, the terminal device may determine an m-th sidelink time unit after the first sidelink time unit as transmission time of sidelink data, or if the m-th sidelink time unit is unavailable (for example, scene one or scene two), the terminal device may determine an a3-th available sidelink time unit after the m-th sidelink time unit as the transmission time of the sidelink data, for example, a3=1 or another value. Herein, m is an index value indicated by the first indication information.

Optionally, in some implementations, determining the first sidelink time unit according to the second sidelink time unit may include determining the second sidelink time unit as the first sidelink time unit, or determining a K1-th sidelink time unit after the second sidelink time unit as the first sidelink time unit, K1 is an integer greater than or equal to 1, optionally, K1 may be 2, 4, 8, etc.

That is, the terminal device may determine the transmission time of the sidelink data by taking a sidelink time unit receiving scheduling information or a certain sidelink time unit after the sidelink time unit receiving the scheduling information as a boundary and combining the index value.

Similar to the previous implementations, if a time unit indicated by the index value is unavailable, the terminal device may send the sidelink data on an a3-th available sidelink time unit after the first sidelink time unit, and a3 may be 1 or another value.

In some specific implementations, the specific boundary may be a first sidelink subframe, and the terminal device determines a second sidelink subframe on which the first control information is received as the first sidelink subframe, or the terminal device determines a K1-th sidelink subframe after the second sidelink subframe on which the first control information is received as the first sidelink subframe, K1 may be pre-configured or configured by a network, optionally, K1 may be 2, 4, 8, etc. This implementation is applicable to a scenario where one downlink subframe corresponds to multiple sidelink subframes (Scenario one), and also applicable to a scenario where one sidelink subframe corresponds to multiple downlink subframes (Scenario two). Specific implementations will be illustrated by examples below in combination with the two scenarios.

Figure 3:
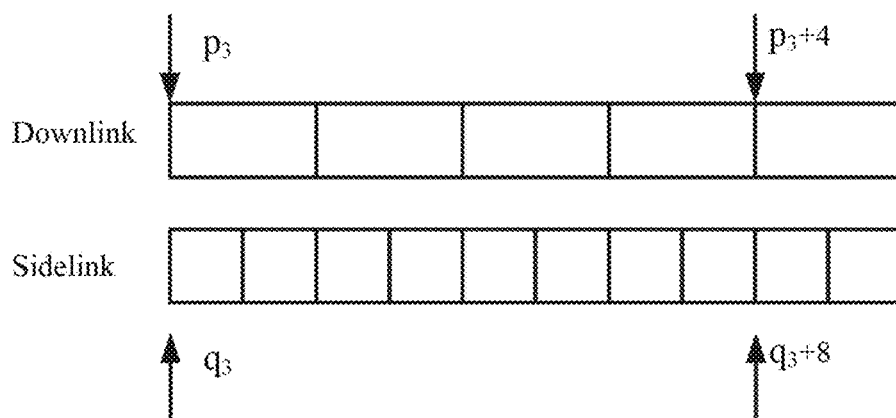
FIG. 3 is a schematic diagram of a way of indicating transmission time of sidelink data.

Scenario one: as shown in FIG. 3, one downlink subframe corresponds to two sidelink subframes, the terminal device receives DCI on a sidelink subframe q3 (corresponding to a downlink subframe p3), a downlink subframe p3+4 corresponds to a sidelink subframe q3+8 and a sidelink subframe q3+9. Processing time of the terminal device is considered from the downlink subframe p3 to the downlink subframe p3+4.

Case one: the specific boundary is the sidelink subframe q3.

If the index value is 8, which is relative to the sidelink subframe q3, the terminal device may determine the sidelink subframe q3+8 as the transmission time of the sidelink data, and may further send the sidelink data on the sidelink subframe q3+8.

Case two: the specific boundary is a sidelink subframe q3+8.

The index value may be 0 or 1, which is relative to the sidelink subframe q3+8, and is used for indicating the sideink subframe q3+8 or the sidelink subframe q3+9 corresponding to the downlink subframe p3+4, respectively, so that the terminal device may determine on which sidelink subframe corresponding to the downlink subframe p3+4 the sidelink data will be sent according to the index value.

Figure 4A:
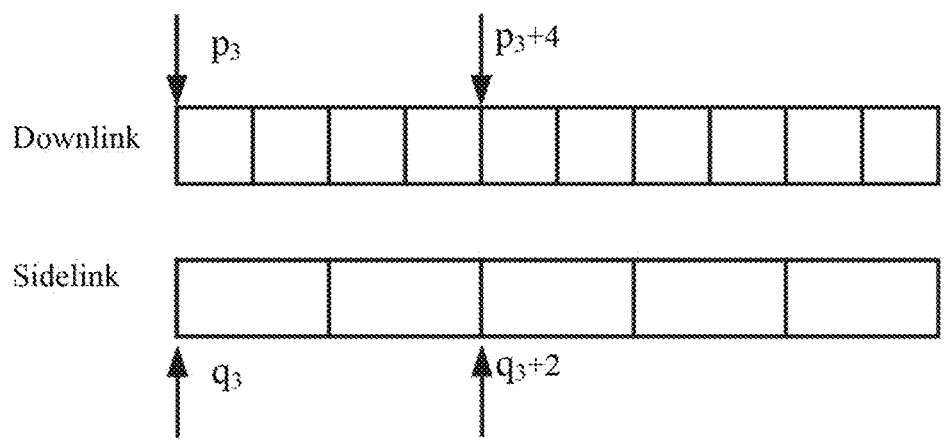
FIG. 4A is a schematic diagram of another way of indicating transmission time of sidelink data.
Figure 4B:
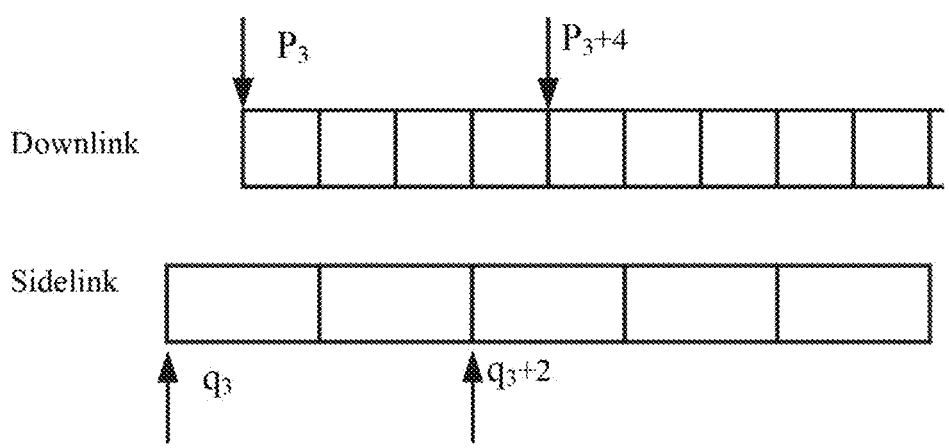
FIG. 4B is a schematic diagram of yet another way of indicating transmission time of sidelink data.

Scenario two: one sidelink subframe corresponds to two downlink subframes, the terminal device receives DCI on the sidelink subframe q3 (corresponding to the downlink subframe p3), then a sidelink subframe q3+2 corresponds to the downlink subframe p3+4, as shown in FIGS. 4A and 4B. The difference between FIGS. 4A and 4B is that the downlink subframe p3 and the sidelink subframe q3 may be aligned or have an offset value.

Case one: the specific boundary is the sidelink subframe q3.

If the index value is 2, which is relative to the sidelink subframe q3, the terminal device may send the sidelink data on the sidelink subframe q3+2.

Case two: the specific boundary may be the sidelink subframe q3+2.

The index value may be 0, which is used for indicating the sidelink subframe q3+2 corresponding to the downlink subframe p3+4, then the terminal device may send the sidelink data on the sidelink subframe q3+2.

Implementation Four

The specific boundary is a first downlink time unit, the first downlink time unit is determined according to a second downlink time unit, the second downlink time unit is a time unit of a downlink on which the terminal device receives the first control information, and the first indication information is used for indicating an index value of a time unit relative to the first downlink time unit.

Therefore, according to the first indication information, the terminal device may determine an n-th sidelink time unit after the first downlink time unit as transmission time of sidelink data, or if the n-th sidelink time unit is unavailable, the terminal device may also determine an a4-th available sidelink time unit after the n-th sidelink time unit as transmission time of sidelink data, optionally, a4=1 or another value, and n is an index value indicated by the first indication information Optionally, in some implementations, determining the first downlink time unit according to the second downlink time unit may include determining the second downlink time unit as the first downlink time unit, or determining a K2-th downlink time unit after the second downlink time unit as the first downlink time unit, K2 is an integer greater than 1, optionally, K2 may be 2, 4, 8, etc.

That is, the terminal device may determine the transmission time of the sidelink data by taking a downlink time unit on which the terminal device receives scheduling information or a certain downlink time unit after the downlink time unit on which the terminal device receives the scheduling information as a boundary and combining the index value.

Similar to the previous implementations, if a time unit indicated by the index value is unavailable, the terminal device may send the sidelink data on an a4-th available sidelink time unit after the first downlink time unit, and a4 may be 1 or another value.

In some specific implementations, the specific boundary may be a first downlink subframe, and the terminal device may determine a second downlink subframe on which the first control information is received as the first downlink subframe, or the terminal device may determine a K2-th downlink subframe after the second downlink subframe on which the first control information is received as the first downlink subframe, K2 may be pre-configured or configured by a network, optionally, K2 may be 2, 4, 8, etc. This implementation is applicable to the above-mentioned scenarios one and two as well. Specific implementations will be illustrated by examples below in combination with the two scenarios.

Scenario one: as shown in FIG. 3, one downlink subframe corresponds to two sidelink subframes, and the terminal device receives DCI on downlink subframe p3 (corresponding to sidelink subframe q3), then a downlink subframe p3+4 corresponds to a sidelink subframe q3+8 and a sidelink subframe q3+9, and processing time of the terminal device is considered from the downlink subframe p3 to the downlink subframe p3+4.

Case one: the specific boundary is the downlink subframe p3.

If the index value is 8, which is relative to the downlink subframe p3, the terminal device may send the sidelink data on an 8th sidelink subframe after the sidelink subframe q3 corresponding to the downlink subframe p3.

Case two: the specific boundary is the downlink subframe p3+4.

The index value may be 0 or 1, which is relative to the downlink subframe p3+4, and indicates the sidelink subframe q3+8 or the sidelink subframe q3+9 corresponding to the downlink subframe p3+4 respectively, so the terminal device may determine whether to send the sidelink data on the sidelink subframe q3+8 or sidelink subframe q3+9 corresponding to the downlink subframe p3+4 according to the index value.

Scenario two: one sidelink subframe corresponds to two downlink subframes, the terminal device receives DCI on the downlink subframe p3 (corresponding to the sidelink subframe q3), and the downlink subframe p3+4 corresponds to a sidelink subframe q3+2, as shown in FIG. 4A or 4B.

Case one: the specific boundary may be the downlink subframe p3.

If the index value is 4, which is relative to the downlink subframe p3, the terminal device may send the sidelink data on a sidelink subframe corresponding to a fourth downlink subframe after the downlink subframe p3, that is, on the sidelink subframe q3+2.

Case two: the specific boundary is the downlink subframe p3+4.

If the index value is 0, which is relative to the downlink subframe p3+4, the terminal device may send the sidelink data on the sidelink subframe q3+2 corresponding to the downlink subframe p3+4.

It should be understood that the processing time of the terminal in the above implementations is only an exemplary description, and a length of the specific processing time depends on a processing capability of a terminal.

Optionally, in some implementations, determining, by the terminal device, the transmission time of the sidelink data according to the first control information includes: the terminal device determines the transmission time of the sidelink data according to the first control information, first subcarrier spacing and second subcarrier spacing.

Herein, the first subcarrier spacing is subcarrier spacing of a carrier or a Bandwidth Part (BWP) in which the first control information is, and the second subcarrier spacing is subcarrier spacing of a carrier, a BWP or a resource pool in which the sidelink data is.

In the foregoing implementations, the first indication information may be used for indicating parameters such as an index or an offset value according to granularity of a time unit on the sidelink. In some further implementations, the first indication information may be used for indicating parameters such as an index or an offset value according to granularity of a time unit on the downlink. In this case, a relationship between granularity of the time unit of the downlink and that of the sidelink is needed, so as to further determine an index or an offset value on the sidelink, that is, the transmission time of the sidelink data.

Specifically, the terminal device may determine the transmission time of the sidelink data according to the first control information in combination with the first subcarrier spacing and the second subcarrier spacing, herein the first subcarrier spacing and the second subcarrier spacing are used for determining the number of sidelink time units corresponding to one downlink time unit. For example, if one downlink time unit corresponds to two sidelink time units and an index or offset value indicated by the first indication information is 2, it may be determined that the index or offset value on the sidelink is 4, that is, the transmission time of the sidelink data is a time domain location of an offset value 4 relative to the specific boundary.

Optionally, in some implementations, the method 200 may further includes: the terminal device acquires first configuration information and determines the first subcarrier spacing according to the first configuration information, and the terminal device acquires second configuration information and determines the second subcarrier spacing according to the second configuration information.

Optionally, the first configuration information may be used for indicating the first subcarrier spacing, and the second configuration information may be used for indicating the second subcarrier spacing.

Optionally, the first configuration information is pre-configured or configured by a network device, for example, the network device may send the first configuration information to the terminal device through higher layer signaling, such as Radio Resource Control (RRC) signaling.

Optionally, the second configuration information is pre-configured or configured by a network device. For example, the network device may send the second configuration information to the terminal device through higher layer signaling, such as RRC signaling.

Optionally, the first configuration information and the second configuration information may be the same configuration information or different configuration information, which is not limited by the implementations of the present application.

It should be understood that the above ways of indicating the transmission time of the sidelink data are only examples, which may be used alone or through combination or be used in combination with a sending way of the first control information in the above implementations. For example, the index value indicated by the first indication information may be determined first according to the sending way of the first control information, and then the transmission time of the sidelink data may be determined according to a determination approach in the above implementations.

By way of example but not limitation, the sending way of the first control information may refer to at least one of the following: a Physical Downlink Control Channel (PDCCH) resource, a search space, an aggregation level, a beam, an antenna port, a precoding matrix, a Modulation and Coding Scheme (MCS), which are used for sending the first control information, a mask sequence, a scrambling sequence and a Demodulation Reference Signal (DMRS) sequence, which are sequence information for processing the first control information, and a Radio Network Temporary Identity (RNTI), etc.

Optionally, in some implementations, the sending way of the first control information may have a first corresponding relationship with the transmission time of the sidelink data, so that the terminal device may determine the transmission time of the sidelink data according to the sending way of the first control information in combination with the first corresponding relationship.

For example, different mask sequences may correspond to different transmission times of sidelink data, and the network device may perform a mask addition processing on the first control information through different mask sequences to indicate different transmission times of the sidelink data to the terminal device. Then the terminal device may use different mask sequences to process the first control information, determine a mask sequence used by the network device, and further determine transmission time of sidelink data indicated by the network device in combination with the first corresponding relationship. For example, if mask sequence 1 corresponds to index value 0 and mask sequence 2 corresponds to index value 1, the network device may perform a mask addition processing on the first control information using mask sequence 2, while the terminal device may process the first control information using mask sequence 1 and mask sequence 2 to determine that the mask sequence used by the network device is mask sequence 2, and then determine the corresponding index value 1. Further, the terminal device may determine a time unit indicated by the index value 1 as the transmission time of the sidelink data. A specific execution process may adopt the relevant description of the previous implementations, which will not be described repeatedly herein.

For another example, different search spaces may correspond to different transmission times of sidelink data, and the network device may send the first control information through different search spaces to indicate different transmission times of the sidelink data to the terminal device, so the terminal device may determine the transmission time of the sidelink data indicated by the network device according to a search space receiving the first control information in combination with the first corresponding relationship. For example, if search space 1 corresponds to index value 0, search space 2 corresponds to index value 1, and the network device uses search space 1 to send the first control information, the terminal device may determine that a corresponding index value is 0 according to the search space receiving the first control information. Further, the terminal device may determine a time unit indicated by the index value 0 as the transmission time of the sidelink data. A specific execution process may adopt the relevant description of the previous implementations, which will not be described repeatedly herein.

Optionally, the network device may also implicitly indicate different transmission times of sidelink data by using different information or parameters such as different RNTIs or PDCCH resources, which will not be described repeatedly herein for brevity.

Therefore, according to the method for data transmission of the implementation of the present application, a terminal device may determine transmission time of sidelink data scheduled by a network device according to indication information carried in first control information from the network device or through a sending way of the first control information, so that the terminal device may send the sidelink data at the transmission time.

Method implementations of the present application are described in detail above with reference to FIGS. 2 to 4, apparatus implementations of the present application are described in detail below with reference to FIGS. 5 to 7. It should be understood that the apparatus implementations correspond to the method implementations respectively, and similar descriptions of the apparatus implementations may refer to descriptions of the method implementations.

Figure 5:
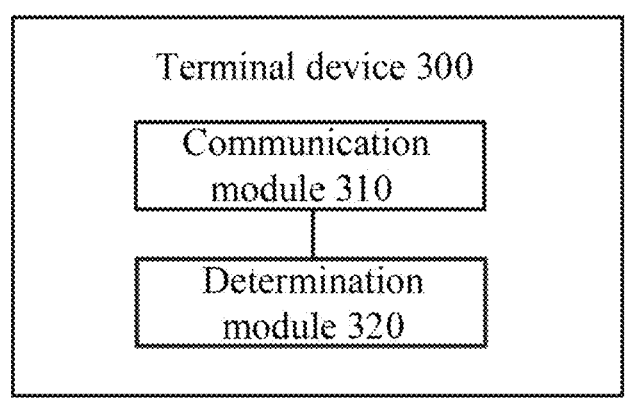
FIG. 5 is a schematic block diagram of a terminal device provided by an implementation of the present application.

FIG. 5 is a schematic block diagram of a terminal device according to an implementation of the present application. As shown in FIG. 5, the terminal device 300 includes: a communication module 310, configured to receive first control information sent by a network device; and a determination module 320, configured to determine transmission time of sidelink data according to the first control information.

Optionally, in some implementations, the first control information is downlink control information (DCI), and the determination module is specifically configured to determine the transmission time of the sidelink data according to first indication information carried in the first control information.

Optionally, in some implementations, the first indication information is used for indicating an index value or an offset value of a time unit relative to a specific boundary, and the determination module is further configured to determine the transmission time of the sidelink data according to the specific boundary and the index value.

Optionally, in some implementations, the specific boundary is a boundary of a radio frame, one radio frame includes N sidelink time units, and the first indication information is used for indicating an index value or index values of one or more of N time units, N is an integer greater than 1.

Optionally, in some implementations, the determination module is further configured to determine a time unit or time units indicated by the index value or index values in the N sidelink time units as the transmission time of the sidelink data.

Optionally, in some implementations, the specific boundary is a boundary of a radio frame period, one radio frame period includes L sidelink time units, and the first indication information is used for indicating an index value or index values of one or more of L time units, L is an integer greater than 1.

Optionally, in some implementations, the determination module is further configured to determine a time unit or time units indicated by the index value or index values in the L sidelink time units as the transmission time of the sidelink data.

Optionally, in some implementations, the specific boundary is a first sidelink time unit, the first sidelink time unit is determined according to a second sidelink time unit which is a time unit of a sidelink on which the terminal device receives the first control information, and the first indication information is used for indicating an index value of a time unit relative to the first sidelink time unit.

Optionally, in some implementations, the determination module is further configured to determine an m-th sidelink time unit after the first sidelink time unit as the transmission time of the sidelink data; or, determine a first available sidelink time unit after m sidelink time units immediately following the first sidelink time unit as the transmission time of the sidelink data; wherein the m is the index value.

Optionally, in some implementations, the specific boundary is a first downlink time unit, the first downlink time unit is determined according to a second downlink time unit which is a time unit of a downlink on which the terminal device receives the first control information, and the first indication information is used for indicating an index value of a time unit relative to the first downlink time unit.

Optionally, in some implementations, the determination module is further configured to determine an n-th sidelink time unit after the first downlink time unit as the transmission time of the downlink data; or, determine a first available sidelink time unit after n sidelink time units immediately following the first downlink time unit as the transmission time of the sidelink data; wherein n is the index value.

Optionally, in some implementations, the determination module is further configured to determine the transmission time of the sidelink data according to at least one of the following corresponding to the first control information: sequence information, a radio network temporary identifier (RNTI), a search space, an aggregation level and a transmission resource.

Optionally, in some implementations, the determination module is further configured to determine the transmission time of the sidelink data according to a first corresponding relationship and at least one of the following corresponding to the first control information: the sequence information, the radio network temporary identifier (RNTI), the search space, the aggregation level and a transmission resource.

Herein, the first corresponding relationship is a corresponding relationship between an index of a time unit and at least one of the sequence information, the radio network temporary identifier (RNTI), the search space, the aggregation level and the resource.

Optionally, in some implementations, the sequence information is at least one of a mask sequence, a scrambling sequence and a demodulation reference signal (DMRS) sequence.

Optionally, in some implementations, the determination module 320 is further configured to determine the transmission time of the sidelink data according to the first control information, first subcarrier spacing and second subcarrier spacing.

Herein, the first subcarrier spacing is subcarrier spacing of a carrier or a Bandwidth Part (BWP) in which the first control information is, and the second subcarrier spacing is subcarrier spacing of a carrier, a BWP or a resource pool in which the sidelink data is.

Optionally, in some implementations, the communication module 310 is further configured to acquire first configuration information.

The determination module 320 is further configured to determine the first subcarrier spacing according to the first configuration information.

The communication module 310 is further configured to acquire second configuration information.

The determination module 320 is further configured to determine the second subcarrier spacing according to the second configuration information.

Optionally, in some implementations, the first configuration information is information configured by a network or pre-configured; or, the second configuration information is information configured by a network or pre-configured.

Optionally, in some implementations, the time unit is a subframe or a time slot.

Figure 6:
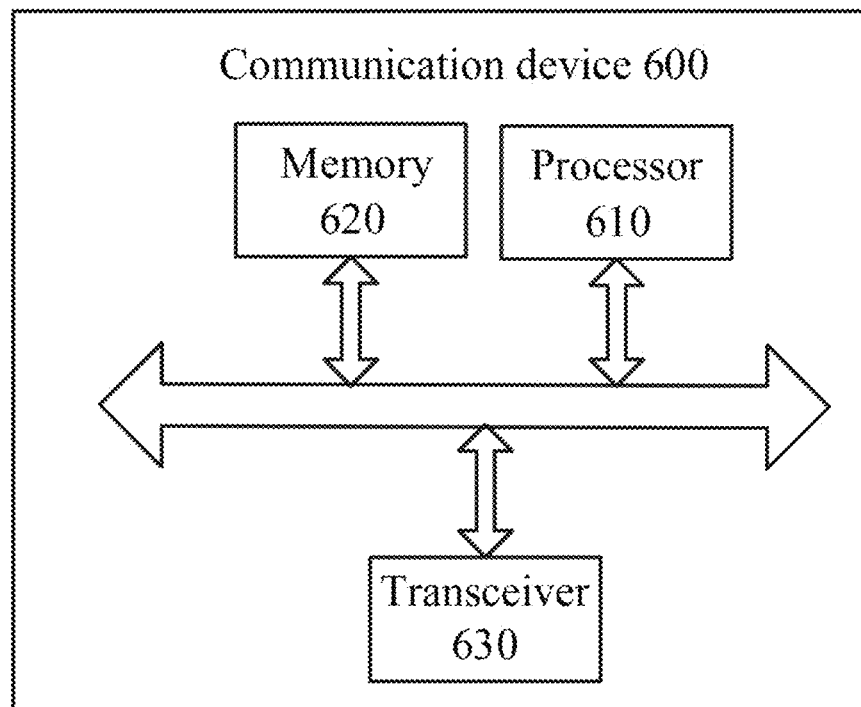
FIG. 6 is a schematic block diagram of another terminal device provided by an implementation of the present application.

FIG. 6 is a schematic diagram of structure of a communication device 600 according to an implementation of the present application. The communication device 600 shown in FIG. 6 includes a processor 610. The processor 610 may call and run a computer program from a memory to implement the method in the implementation of the present application.

Optionally, as shown in FIG. 6, the communication device 600 may further include a memory 620. The processor 610 may call and run a computer program from the memory 620 to implement the method in the implementation of the present application.

The memory 620 may be a separate device independent of the processor 610 or may be integrated in the processor 610.

Optionally, as shown in FIG. 6, the communication device 600 may further include a transceiver 630. The processor 610 may control the transceiver 630 to communicate with other devices. Specifically, the processor 610 may control the transceiver 630 to send information or data to other devices or receive information or data sent by other devices.

The transceiver 630 may include a transmitter and a receiver. The transceiver 630 may further include antennas, and the number of antennas may be one or more.

Optionally, the communication device 600 may be specifically a mobile terminal/terminal device of the implementation of the present application, and the communication device 600 may implement the corresponding processes implemented by the mobile terminal/terminal device in the various methods of the implementations of the present application, which will not be repeated herein for brevity.

Figure 7:
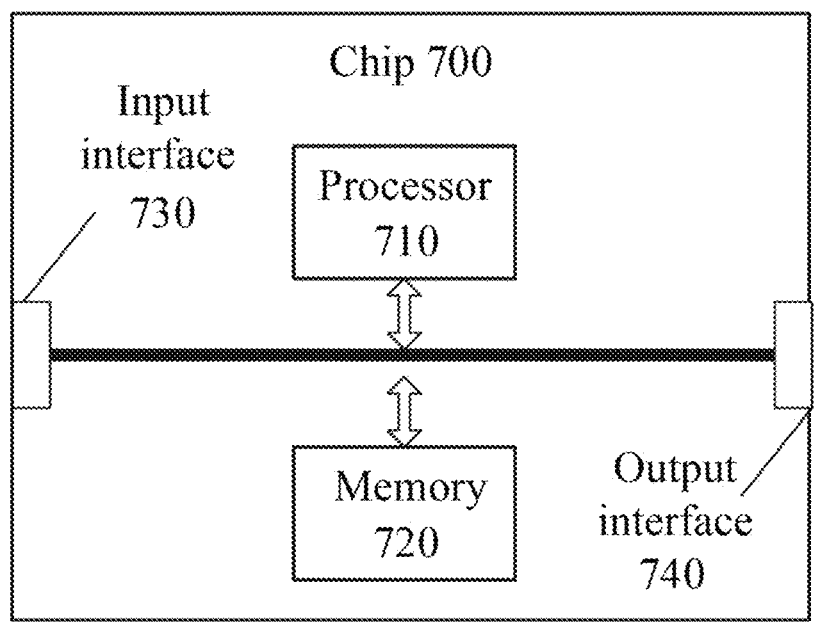
FIG. 7 is a schematic block diagram of a chip provided by an implementation of the present application.

FIG. 7 is a schematic diagram of structure of a chip according to an implementation of the present application. A chip 700 shown in FIG. 7 includes a processor 710. The processor 710 may call and run a computer program from a memory to implement the method in the implementation of the present application.

Optionally, as shown in FIG. 7, the chip 700 may further include a memory 720. The processor 710 may call and run a computer program from the memory 720 to implement the method in the implementation of the present application.

The memory 720 may be a separate device independent of the processor 710 or may be integrated in the processor 710.

Optionally, the chip 700 may further include an input interface 730. The processor 710 may control the input interface 730 to communicate with other devices or chips. Specifically, the processor 710 may control the input interface 730 to acquire information or data sent by other devices or chips.

Optionally, the chip 700 may further include an output interface 740. The processor 710 may control the output interface 740 to communicate with other devices or chips. Specifically, the processor 710 may control the output interface 740 to output information or data to other devices or chips.

Optionally, the chip may be applied in a mobile terminal/terminal device of the implementation of the present application, and the chip may implement the corresponding processes implemented by the mobile terminal/terminal device in the various methods of the implementations of the present application, which will not be repeated here for brevity.

It should be understood that the chip mentioned in the implementation of the present application may be referred to as a system-level chip, a system chip, a chip system or a system-on-chip, etc.

It should be understood that the processor in the implementation of the present application may be an integrated circuit chip having a signal processing capability. In an implementation process, various acts of the foregoing method implementations may be implemented by using an integrated logic circuit of hardware in the processor or instructions in a form of software. The processor may be a general purpose processor, a digital signal processor (Digital Signal Processing, DSP), an application specific integrated circuit (Application Specific Integrated Circuit, ASIC), a field programmable gate array (Field Programmable Gate Array, FPGA) or another programmable logic device, a discrete gate or a transistor logic device, or a discrete hardware component. The processor may implement or perform methods, acts and logical block diagrams disclosed in the implementations of the present application. The general purpose processor may be a microprocessor, or the processor may optionally be any conventional processor, or the like. The acts of the method disclosed with reference to the implementations of the present application may be directly implemented by a hardware decoding processor, or may be implemented by a combination of hardware and software modules in the decoding processor. The software modules may be located in a mature storage medium in the art, such as a random access memory, a flash memory, a read-only memory, a programmable read-only memory, an electrically erasable programmable memory, or a register. The storage medium is located in the memory, and the processor reads information in the memory and implements the acts of the foregoing methods in combination with hardware of the processor.

It may be understood that the memory in the implementations of the present application may be a volatile memory or a non-volatile memory, or may include both the volatile memory and the non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus random access memory (Direct Rambus RAM, DR RAM). It should be noted that the memory in the systems and methods described in this disclosure is intended to include but not limited to these and any other suitable type of memory.

It should be understood that the foregoing memory is an example for illustration and should not be construed as limiting. For example, optionally, the memory in the implementations of the present application may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, memory in the implementations of the present application is intended to include, but not limited to, these and any other suitable type of memory.

An implementation of the present application further provides a computer readable storage medium configured to store a computer program.

Optionally, the computer readable storage medium may be applied in a network device of the implementation of the present application, and the computer program enables a computer to perform the corresponding processes implemented by the network device in various methods of the implementations of the present application.

Optionally, the computer readable storage medium may be applied in a mobile terminal/terminal device of the implementation of the present application, and the computer program enables the computer to perform the corresponding processes implemented by the mobile terminal/terminal device in various methods of the implementations of the present application.

An implementation of the present application further provides a computer program product including computer program instructions.

Optionally, the computer program product may be applied in a network device of the implementation of the present application, and the computer program instructions enable a computer to perform the corresponding processes implemented by the network device in various methods of the implementations of the present application, which will not be described repeatedly herein for brevity.

Optionally, the computer program product may be applied in a mobile terminal/terminal device of the implementation of the present application, and the computer program instructions enable the computer to perform the corresponding processes implemented by the mobile terminal/terminal device in various methods according to the implementations of the present application, which will not be described repeatedly herein for brevity.

An implementation of the present application further provides a computer program.

Optionally, the computer program may be applied in a network device of the implementation of the present application. When the computer program is run on a computer, the computer is enabled to perform the corresponding processes implemented by the network device in various methods of the implementations of the present application, which will not be described repeatedly herein for brevity.

Optionally, the computer program may be applied in a mobile terminal/terminal device of the implementation of the present application. When the computer program is run on a computer, the computer is enabled to perform the corresponding processes implemented by the mobile terminal/terminal device in various methods of the implementations of the present application, which will not be described repeatedly herein for brevity.

A person of ordinary skill in the art may be aware that, units and algorithm acts of the examples described in combination with the implementations disclosed in this disclosure may be implemented by using electronic hardware or a combination of computer software and electronic hardware. Whether the functions are implemented by using hardware or software depends on a particular application and a design constraint condition of the technical solution. A person skilled in the art may use different methods to implement the described functions for each particular application, but it should not be considered that the implementation goes beyond the scope of the present application.

A person skilled in the art may clearly understand that, for the purpose of convenient and brief description, a detailed working process of the foregoing system, apparatus, and unit, may refer to a corresponding process in the foregoing method implementations, and details are not described herein again.

In the several implementations provided in the present application, it should be understood that the disclosed system, apparatus, and method may be implemented in other manners. The apparatus implementations are only illustrative, for example, division of the units is only a logical function division, and there may be other division manners in actual realization. For example, multiple units or components may be combined or integrated into another system, or some features may be ignored or not executed. In addition, the displayed or discussed mutual couplings or direct couplings or communication connections may be indirect couplings or communication connections through some interfaces, apparatuses or units, and may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the implementations.

In addition, various functional units in various implementations of the present application may be integrated in one processing unit, or various units may be physically present separately, or two or more units may be integrated in one unit.

When the functions are implemented in the form of a software functional unit and sold or used as an independent product, the functions may be stored in a computer-readable storage medium. Based on such an understanding, the technical solutions of the present application essentially, or the part contributing to the prior art, or a part of the technical solutions, may be embodied in a form of a software product. The computer software product is stored in a storage medium and includes several instructions for enabling a computer device (which may be a personal computer, a server, a network device, or the like) to perform all or some of the acts of the methods described in the implementations of the present application. The foregoing storage medium includes: any medium that can store program codes, such as a USB flash drive, a removable hard disk, a read-only

What we claim is:

1. A method for data transmission, comprising:
   receiving, by a terminal device, first control information sent by a network device; and
   determining, by the terminal device, transmission time of sidelink data according to first indication information carried in the first control information;
   wherein the first indication information is used for indicating an offset value of a time unit relative to a specific boundary, and determining, by the terminal device, the transmission time of the sidelink data according to the first indication information carried in the first control information comprises:
   determining, by the terminal device, the transmission time of the sidelink data according to the specific boundary and the offset value.

2. The method of claim 1, wherein the first control information is downlink control information (DCI).

3. The method of claim 1, wherein the specific boundary is a boundary of a radio frame period.

4. The method of claim 1, wherein the specific boundary is determined according to a second downlink time unit, the second downlink time unit is a time unit of a downlink on which the terminal device receives the first control information, and the first indication information is used for indicating an offset value of a time unit relative to a first downlink time unit.

5. The method of claim 4, wherein determining, by the terminal device, the transmission time of the sidelink data according to the specific boundary and the offset value comprises:
   determining, by the terminal device, a first available sidelink time unit after n sidelink time units immediately following the specific boundary as the transmission time of the sidelink data,
   wherein the n is the offset value.

6. The method of claim 1, wherein the time unit is a subframe or a time slot.

7. A terminal device, comprising a processor and a transceiver, wherein
   the transceiver is configured to receive first control information sent by a network device; and
   the processor is configured to determine transmission time of sidelink data according to first indication information carried in the first control information;
   wherein the first indication information is used for indicating an offset value of a time unit relative to a specific boundary, and the processor is further configured to:
   determine the transmission time of the sidelink data according to the specific boundary and the offset value.

8. The terminal device of claim 7, wherein the first control information is downlink control information (DCI).

9. The terminal device of claim 7, wherein the specific boundary is a boundary of a radio frame period.

10. The terminal device of claim 7, wherein the specific boundary is determined according to a second downlink time unit, the second downlink time unit is a time unit of a downlink on which the terminal device receives the first control information, and the first indication information is used for indicating an offset value of a time unit relative to a first downlink time unit.

11. The terminal device of claim 10, wherein the processor is further configured to:
   determine a first available sidelink time unit after n sidelink time units immediately following the specific boundary as the transmission time of the sidelink data,
   wherein the n is the offset value.

12. The terminal device of claim 7, wherein the time unit is a subframe or a time slot.

13. A terminal device comprising: a processor and a memory, wherein the memory is configured to store a computer program, and the processor is configured to call and run the computer program stored in the memory to perform the method according to claim 1.

14. A non-transitory computer readable storage medium storing a computer program, wherein the computer program enables a computer to perform the method according to claim 1.

* * * * *